United States Patent Office 3,181,751
Patented May 4, 1965

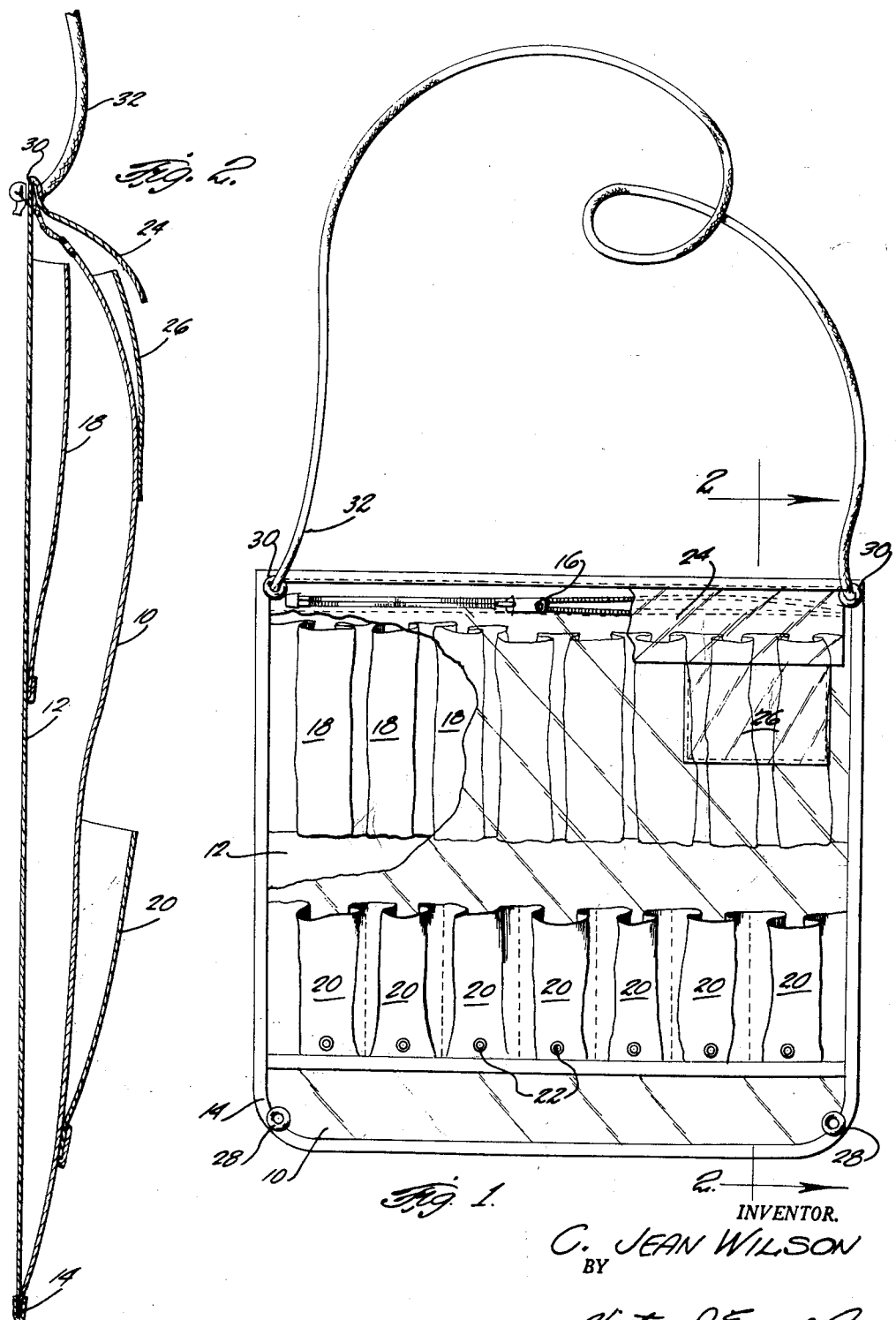

3,181,751
FISHING TACKLE BAG
Claudia Jean Wilson, Fayetteville, Ark., assignor of fifty percent to John Vernon Wilson, Fayetteville, Ark.
Filed June 5, 1963, Ser. No. 285,807
2 Claims. (Cl. 224—5)

The present invention relates to fishing tackle generally and in particular to a bag for containing fishing lures and fishing paraphernalia.

An object of the present invention is to provide a transparent fishing tackle bag in which are a series of pockets each capable of holding a single fishing lure so that the fishing lure is instantly available and is readily identified through the wall of the bag.

Another object of the present invention is to provide a fishing tackle bag which has pockets on the inside for valuable lures and pockets on the outside for less valuable lures.

A still further object of the present invention is to provide a fishing tackle bag of transparent material which is sturdy in construction, one which may be suspended from the shoulder of an individual while fishing, one which is of such material as to resist the penetration by fish hooks, and one which is economically feasible.

These and other objects and advantages of the present invention will be fully apparent from the following description when taken in connection with the annexed drawing, in which:

FIGURE 1 is an elevational view of the bag constructed according to the present invention, with a portion broken away, and FIGURE 2 is a sectional view on an enlarged scale, taken on the line 2—2 of FIGURE 1.

The bag according to the present invention comprises a front wall member 10 and a back wall member 12 secured together along the opposed side edges and the bottom edges by a tape 14.

A zipper assembly 16 releasably closes the upper ends of the front wall member 10 and the back wall member 12 and on the face of the back wall member 12 adjacent the upper portion thereof is a plurality of pockets 18 formed by folding and stitching or else securing another sheet of material to the back wall member 12. The pockets 18 are vertically disposed and are arranged in side by side abutting relation.

The exterior face of the front wall member 10 is also provided in the lower portion thereof with other pockets 20 also vertically disposed and arranged in side by side abutting relation as shown most clearly in FIGURE 1.

Each pocket 20 is provided with a grommet 22 in the lower end thereof so that any water accidentally or inadvertently admitted to the pocket 20 is drained through the grommet 22.

A flap 24 is secured along its upper edge to the back wall member 12 and extends over the zipper assembly 16 so as to protect the zipper assembly from the weather.

On the outer face of the front wall member 10 adjacent one corner and in the upper portion thereof is another pocket 26 for a fishing license.

Preferably the front and back wall members 10 and 12, respectively, and the pockets 18 and 20 are fabricated of translucent plastic of a heavy gauge in order that the fishing tackle carried within the pockets will be viewable through the plastic so as to enable a person to readily identify each plug or lure contained in the pockets. The pocket 26 is also fabricated of a plastic material which is transparent so that the fishing license can be readily examined through the pocket wall.

A pair of grommets 28 in the lower corners of the bag of the present invention permit tying of the bag around the waist of an individual or otherwise securing the bag as desired about the person wearing the bag.

Grommets 30 in the upright corners are positioned so as to receive the end portions of a cord 32 employed to support the bag about the shoulder or other portion of the body of the user of the bag.

The bag of the present invention lends itself to manufacture in any size desired and from any material found practical although a clear plastic is preferable to other materials.

While only a preferred form of the invention is shown and described numerous changes and modifications may be made therein without departing from the spirit of the invention as set forth in the appended claims.

What is claimed is:

1. A fishing tackle bag comprising a flexible back wall member having a bottom edge, a top edge, and spaced side edges, a flexible front wall member having a bottom edge fixedly secured to said back wall member bottom edge, and side edges secured one each to said back wall member side edges to form with said back wall member an open top bag, there being a plurality of vertically disposed first pleated pockets arranged in side by side abutting relation on the upper half portion of the face of said back wall member adjacent said front wall member, there being a plurality of vertically disposed second pockets arranged in side by side abutting relation on the outside face of said front wall member, at least some of said outside pockets being transparent, a zipper closure assembly extending over the top edges of said back wall member and said front wall member for releasably securing said top edges together, said pockets on said outside face having drain openings in the bottom thereof.

2. A fishing tackle bag comprising a generally rectangular back and front wall secured together along the bottom and side edges thereof for forming an open bag, closure means detachably interconnecting the top edges of the back and front wall for forming a closure for the open bag, a pocket forming member attached to the outside surface of said front wall and including a plurality of vertically opening side-by-side pockets defined thereby, said pockets being defined by vertical rows of securement of the pocket forming member to the front wall with the pockets being pleated to receive and contain fish lures and the like therein, the bottom portion of each pocket having a drain opening therein for drainage of moisture from wet fish lures, said pocket forming member being transparent for enabling observation of the articles carried therein.

References Cited by the Examiner
UNITED STATES PATENTS

| 1,555,058 | 9/25 | Hougue | 150—1 |
| 2,675,042 | 4/54 | Herrera | 150—34 |
| 2,684,097 | 7/54 | Truel | 150—35 |
| 2,754,867 | 7/56 | Langer | 150—1 |

HUGO O. SCHULZ, *Primary Examiner.*